US009074826B2

(12) United States Patent
Haupts

(10) Patent No.: US 9,074,826 B2
(45) Date of Patent: Jul. 7, 2015

(54) FLEXIBLE HEAT ACCUMULATOR FOR ENGINE COOLANT

(71) Applicant: Ford Global Technologies, LLC, Dearborn, MI (US)

(72) Inventor: Volker Haupts, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 23 days.

(21) Appl. No.: 13/851,868

(22) Filed: Mar. 27, 2013

(65) Prior Publication Data

US 2013/0255602 A1 Oct. 3, 2013

(30) Foreign Application Priority Data

Mar. 28, 2012 (DE) ........................ 10 2012 204 988

(51) Int. Cl.
*F28D 20/00* (2006.01)
*F01P 11/02* (2006.01)

(52) U.S. Cl.
CPC ............... *F28D 20/00* (2013.01); *Y02E 60/142* (2013.01); *F28D 20/0034* (2013.01); *F28F 2255/02* (2013.01); *F01P 11/029* (2013.01)

(58) Field of Classification Search
CPC ............ F28D 2/00; F01P 11/20; F01P 11/02; F02N 19/00
USPC ................................. 123/41.14, 434; 165/10
See application file for complete search history.

(56) References Cited

U.S. PATENT DOCUMENTS

| | | | | | |
|---|---|---|---|---|---|
| 1,634,394 | A | * | 7/1927 | Bernard | 123/41.14 |
| 4,414,932 | A | | 11/1983 | Lindberg | |
| 4,785,874 | A | * | 11/1988 | Avrea | 165/104.32 |
| 4,790,369 | A | * | 12/1988 | Avrea | 165/104.32 |
| 4,972,901 | A | * | 11/1990 | Hormansdorfer | 165/41 |
| 5,044,430 | A | * | 9/1991 | Avrea | 165/104.32 |
| 5,277,038 | A | * | 1/1994 | Carr | 62/434 |
| 6,477,990 | B2 | * | 11/2002 | Toyoshima et al. | 123/41.14 |
| 6,742,480 | B2 | * | 6/2004 | Onimaru et al. | 123/41.01 |
| 6,892,681 | B2 | * | 5/2005 | Morikawa et al. | 123/41.14 |
| 6,990,931 | B2 | * | 1/2006 | Ito et al. | 123/41.14 |
| 6,994,058 | B2 | * | 2/2006 | Iinuma et al. | 123/41.14 |
| 8,037,851 | B2 | | 10/2011 | Kobayashi et al. | |
| 2008/0245319 | A1 | * | 10/2008 | Toyoshima et al. | 123/41.14 |

FOREIGN PATENT DOCUMENTS

| | | | | | |
|---|---|---|---|---|---|
| EP | 1983167 | A1 | | 2/2007 | |
| GB | 2272969 | A | * | 6/1994 | F24H 7/00 |
| JP | 2010054162 | A | | 3/2010 | |

* cited by examiner

*Primary Examiner* — Lindsay Low
*Assistant Examiner* — Grant Moubry
(74) *Attorney, Agent, or Firm* — Greg Brown; Alleman Hall McCoy Russell & Tuttle LLP

(57) ABSTRACT

A heat accumulator for a vehicle engine, comprising storing coolant in a flexible storage container with an inner body and an outer body, with an insulation device arranged between the bodies, and an inflow and an outflow for the coolant wherein the storage container can expand and deflate in response to the amount of coolant stored. The flexible storage container allows for the heat accumulator to conform to various under hood space constraints.

17 Claims, 5 Drawing Sheets

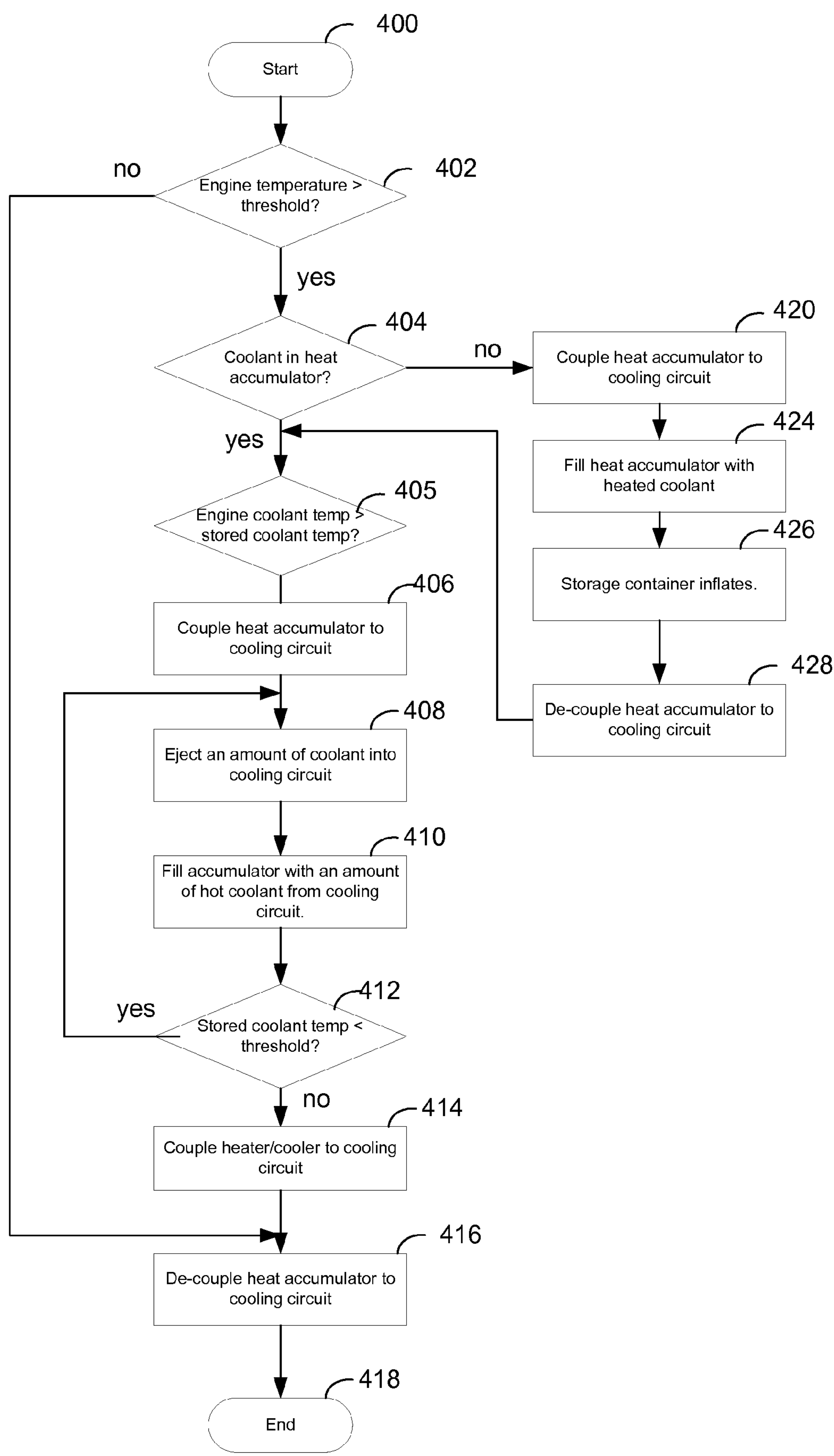
Fig. 4
400
Start
402
Engine temperature > threshold?
no
yes
404
Coolant in heat accumulator?
no
yes
420
Couple heat accumulator to cooling circuit
424
Fill heat accumulator with heated coolant
426
Storage container inflates.
428
De-couple heat accumulator to cooling circuit
405
Engine coolant temp > stored coolant temp?
406
Couple heat accumulator to cooling circuit
408
Eject an amount of coolant into cooling circuit
410
Fill accumulator with an amount of hot coolant from cooling circuit.
412
Stored coolant temp < threshold?
yes
no
414
Couple heater/cooler to cooling circuit
416
De-couple heat accumulator to cooling circuit
418
End 500
Start
502
Engine on?
504
Engine temp < threshold?
no
yes
506
Stored coolant temp > threshold?
no
yes
508
Couple cooling circuit to heat accumulator
510
Deliver heated coolant to engine system
512
Heat accumulator deflates.
yes
no
514
De-couple cooling circuit from heat accumulator
516
Couple engine to cooling circuit to cooler/heater
518
End

FLEXIBLE HEAT ACCUMULATOR FOR ENGINE COOLANT

CROSS REFERENCE TO RELATED APPLICATIONS

The present application claims priority to German Patent Application No. 102012204988.6, filed on Mar. 28, 2012, the entire contents of which are hereby incorporated by reference for all purposes.

BACKGROUND AND SUMMARY

The systems and methods described herein relate to a flexible heat accumulator for a vehicle engine cooling system.

The heating of the drive train from friction has a large influence on an engine's fuel consumption and emissions. This is because the heat from the drive train effects the generation of the fuel mixture. Drive trains operating below a temperature threshold may experience fuel condensation and uneven air-fuel distribution within the chambers and thus lower efficiency. This effect is most apparent during vehicle cold starts. Normally, a motor vehicle which has been driven and is warm experiences cold start conditions after eight or more hours switched off in a stationary state.

Previous embodiments have employed coolant heat accumulators that store engine heat during travel and may hold this heat for over twenty-four hours after the engine has been turned off depending on the external temperature. If cold start and travel are performed on the following day, the heat that is stored in the heat accumulator is released in a small cooling circuit of the engine and can then shorten the warming up phase of the engine. Faster engine heating decreases the fuel consumption and the quality of the emissions In some embodiments, this type of heat accumulator is composed of metal and has a cylindrical shape. It may contain an insulation layer which is usually embodied as a vacuum. The fixed structure of this heat accumulator embodiment, dimensions, and weight, contribute to disadvantages during operation of the vehicle.

EP 1 983 167 A1 discloses a heat accumulator that connects a first container to a second container via a spring. The containers have an inner wall, whose shape is congruent to a cylinder wall of an engine. A heater accumulator medium may be within the containers and may cause the containers to expand as the medium absorbs heat. As a result of this expansion the containers are pushed away from the cylinder wall.

JP2010054162A presents a heat accumulator with a plurality of flexible heat accumulator capsules that are arranged in a heat exchange chamber and are placed under pressure with a pressure plate and deformed as heat is absorbed.

U.S. Pat. No. 4,414,932 discloses a heat accumulator that is in contact with the intake manifold in order to store heat and output it again. The heat accumulator may be embodied as a bellows.

The inventors found that a flexible storage container permits a cost-effective and lightweight solution with a saving in weight of approximately 2.5 to 4.5 kg compared to conventional solutions, which lowers the fuel consumption of the vehicle. In addition, unlike the aforementioned heat accumulators, the disclosed embodiment may contain no rigid solid parts. Storage container material flexibility further allows for the containers external shape to be largely freely selected, simplifying the planning of the engine compartment construction.

A disclosed embodiment of a heat accumulator for engine coolant comprises a flexible storage container with an inner body and an outer body, wherein an insulation device is arranged between the two bodies, as well as an inflow and outflow for the coolant. The coolant, for example may be a liquid such as water that may be used to control the temperature of an engine to provide heating and/or cooling. The heat accumulator may be used in passenger vehicles and trucks as well as in other vehicles, such as agricultural implements or in the construction industry, in shipping and aircraft. The coolant may be used for a vehicle engine or for further components of the drive train. Other embodiments of the heat accumulator may be used to heat up batteries of an electric vehicle or to achieve increased performance of the batteries at cold temperatures. In addition, in electric vehicles the heat accumulator may be used to heat the passenger compartment, as a result of which valuable battery energy can be reserved for vehicle propulsion. It should be noted that these applications are also included under the term vehicle engine.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF DRAWINGS

FIG. 4 depicts an example routine for filling a heat accumulator embodiment.

DETAILED DESCRIPTION

Figure 1:
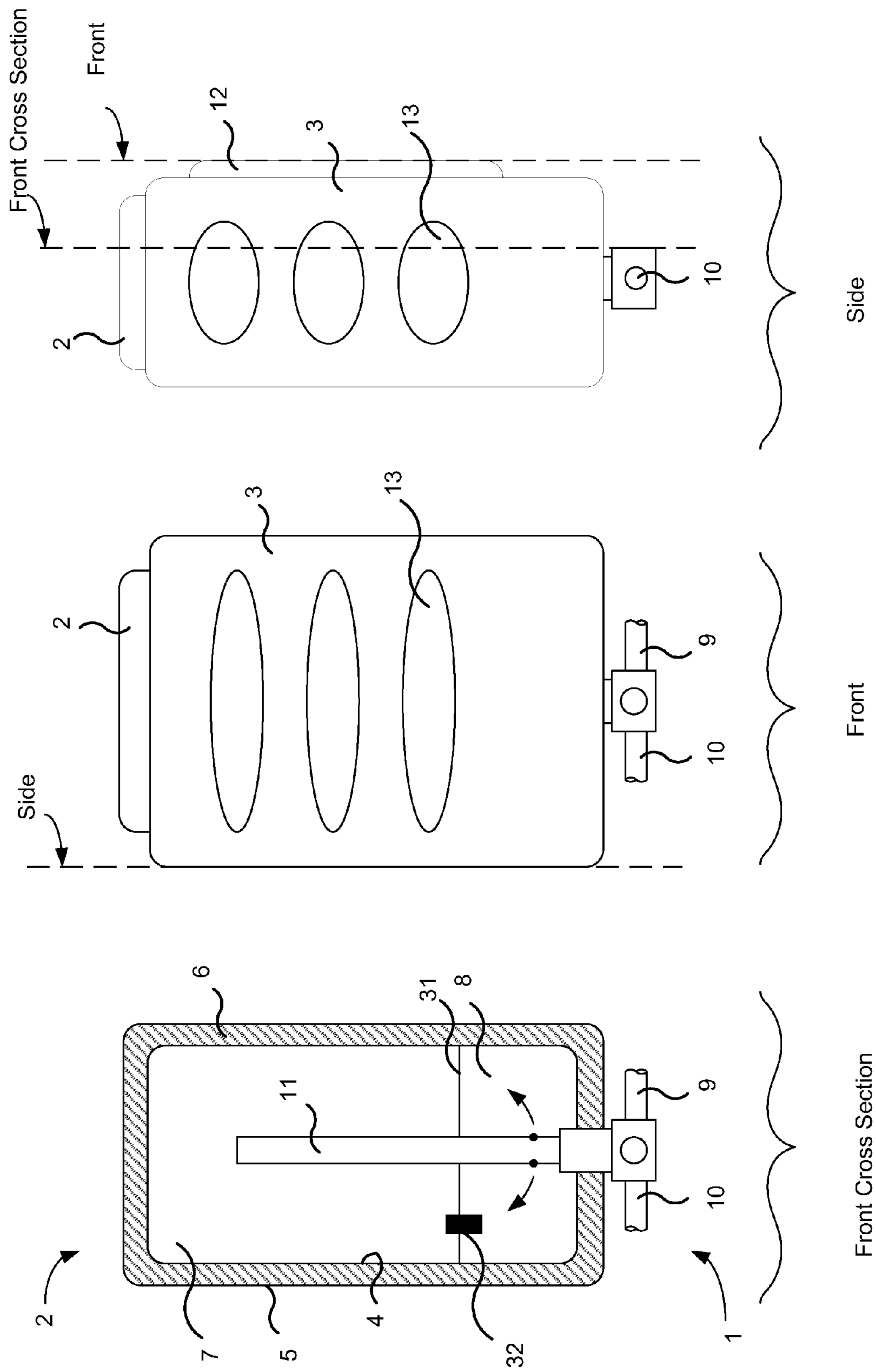
FIG. 1 shows three illustrations of an embodiment of the disclosed heat accumulator.

Engines that have achieved warm operation via operation or an enhanced engine heating system generally return to thermal equilibrium with the environment after eight or more hours switched off in the stationary state. After this extended period of time in the switched off state, initiating engine operation would require a cold start.

In cold conditions fuel may not evaporate readily into the air for combustion hindering the ability to provide a desired AFR. Engine start may even be prevented in some conditions if an amount of fuel does not evaporate for combustion. Further, condensed fuel cannot be oxidized in combustion thus fuel that condenses within the combustion chamber may not ignite, reducing fuel efficiency and increasing emissions. Harmful emissions may be further compounded during cold operating conditions because after-treatment devices such as particulate filters and catalytic converters may experience decreased performance.

However, coolant heat accumulator's store engine heat during travel and may hold this heat for over twenty-four hours depending on the external temperature. Thus, if cold start and travel are performed within 24 hours of warm operation, the heat stored in the heat accumulator may be released in a small cooling circuit of the engine, shortening the warming up phase of the engine. Shortening the length of cold engine operation decreases harmful emissions and increases fuel efficiency.

Traditional heat accumulators are composed of metal that is cylindrically shaped and contain an insulation layer that is embodied as a vacuum. However, these accumulators add additional weight to the vehicle and expend limited under hood space. Thus traditional heat coolers can adversely affect fuel efficiency, and may be incompatible with engine designs that have little under-hood space availability.

The disclosed flexible storage container heat accumulator addresses these disadvantages by decreasing engine weight and production costs using a non-metal material with comparatively high elasticity. In addition, vehicle impact resilience is increased because of the accumulator may not contain rigid solid parts that can penetrate the passenger compartment. The flexibility of the material of the storage container provides the additional advantage of an external shape that may be largely freely selected; this simplifies the planning of the engine compartment construction.

A heat accumulator embodiment for engine coolant may comprise a flexible storage container with an inner body and an outer body, wherein an insulation device is arranged between the two bodies and an inflow and outflow for the coolant. The coolant may be a liquid such as water, and may be used to control the temperature of an engine, and provide heating and/or cooling. The heat accumulator may be used in passenger vehicles and trucks as well as in other vehicles, for example, agricultural implements, the construction industry, shipping, and aircrafts. The coolant can be used for a vehicle engine or for further components of the drive train. It is therefore possible, for example, for the heat accumulator to be used to heat up batteries of an electric vehicle in order to increase performance of the batteries at cold temperatures. Additionally, in electric vehicles the heat accumulator may be used to heat the passenger compartment, as a result of which valuable battery energy can be reserved for vehicle propulsion. These applications are also included under the term vehicle engine herein.

The insulation device can be constructed of a shape-providing material such as a chemically driven foam. The flexible storage container may thus maintain its shape in an empty state. Alternatively, stabilizers such as rods or structures may be provided in the inner body and/or outer body.

The inner body and/or outer body may be constructed of fabric entirely or in part. A lightweight and flexible material such as fabric may be made watertight by providing a rubber coating. The fabric may have a surface structure or texture in order to maintain the pressure of the coolant and increase stability.

The heat accumulator may have a carrier for mounting the coolant storage container. The carrier may serve to attach the storage container in the vehicle, for example in the engine compartment, and may provide the flexible container with rigidity, for example in the case of severe braking maneuvers. This simplifies the design and manufacture of the heat accumulator because the storage container serves to accommodate the coolant, while the carrier serves for attachment and stability. It is therefore possible for any part to be designed and manufactured in an optimum way with respect to its specific requirements.

The carrier may include or be entirely composed of thermoplastic material. This lightweight yet stable material may be particularly suitable for embodiments of the carrier. In addition, the carrier may be manufactured in a wide variety of shapes for adaptation to the conditions in the engine compartment.

The carrier may at least partially enclose the storage container at side regions and on an underside of the storage container. It is therefore possible for the container to be inserted and changed easily, while ensuring sufficient stability. The carrier may cover or enclose the container completely at individual faces. In other embodiments, the carrier may partially cover or enclose the container to minimize weight and material.

Figure 2:
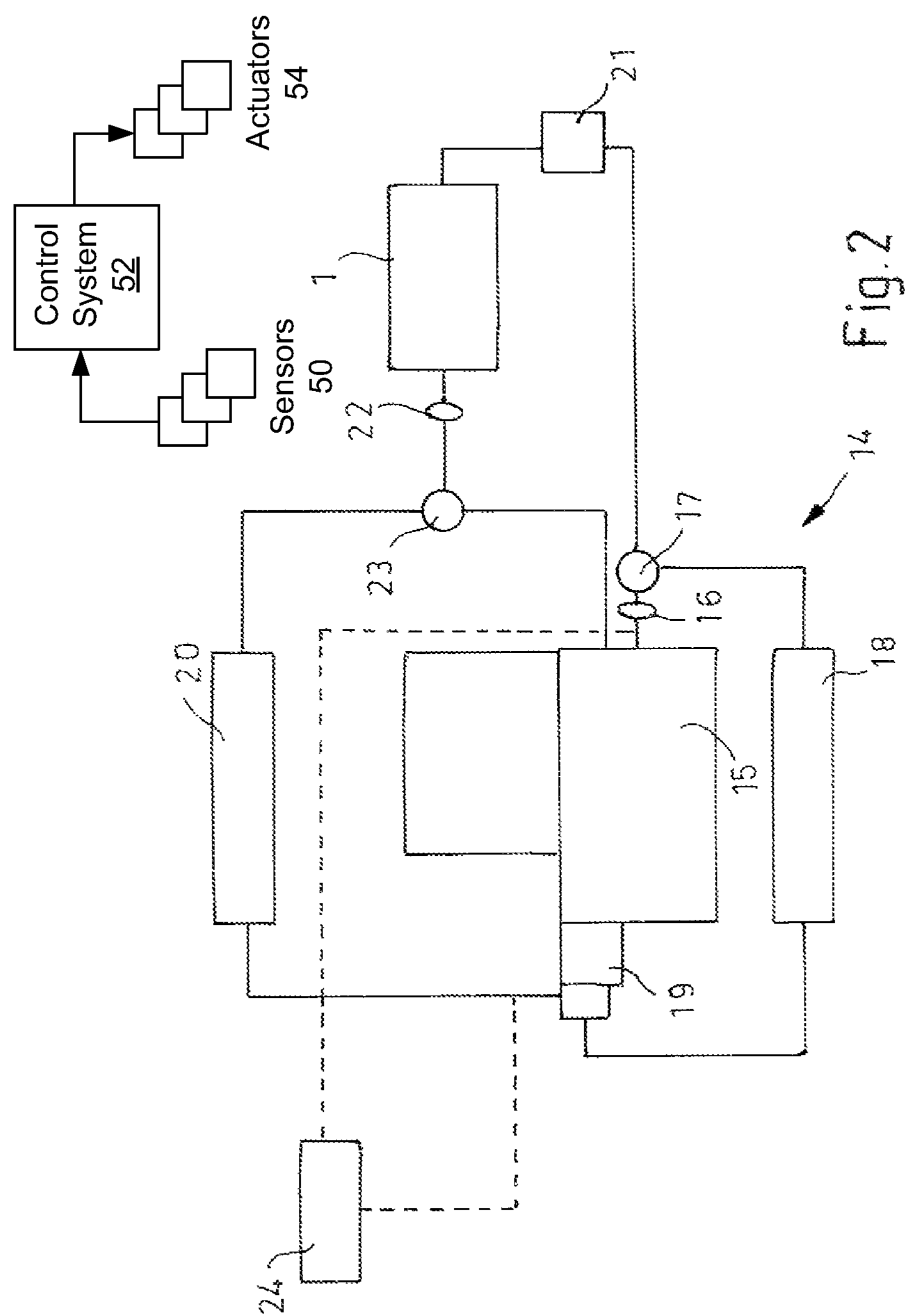
FIG. 2 shows an example coolant circuit with an embodiment of the disclosed heat accumulator.
Figure 3:
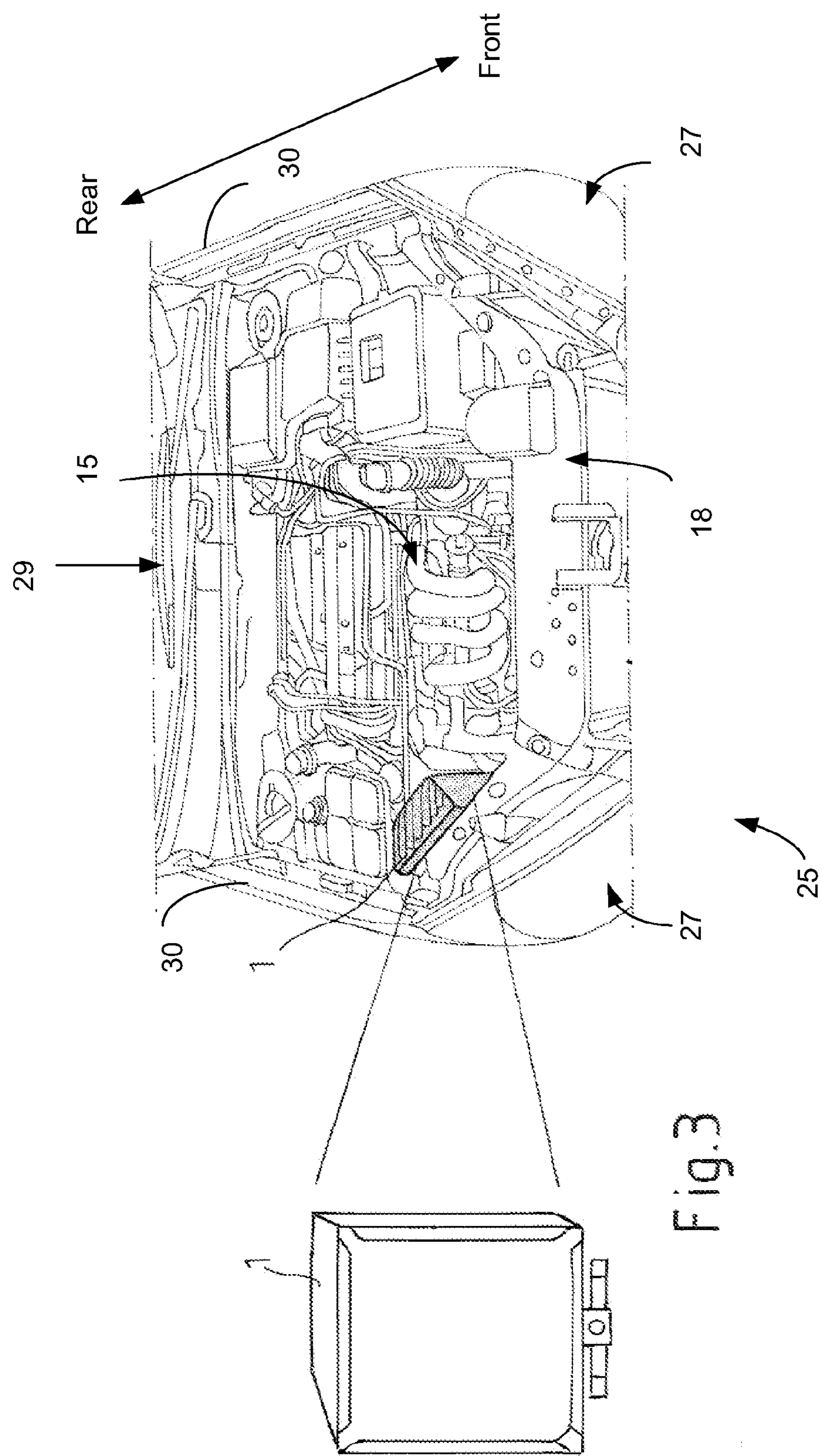
FIG. 3 illustrates an installed embodiment of the heat accumulator.
Figure 5:
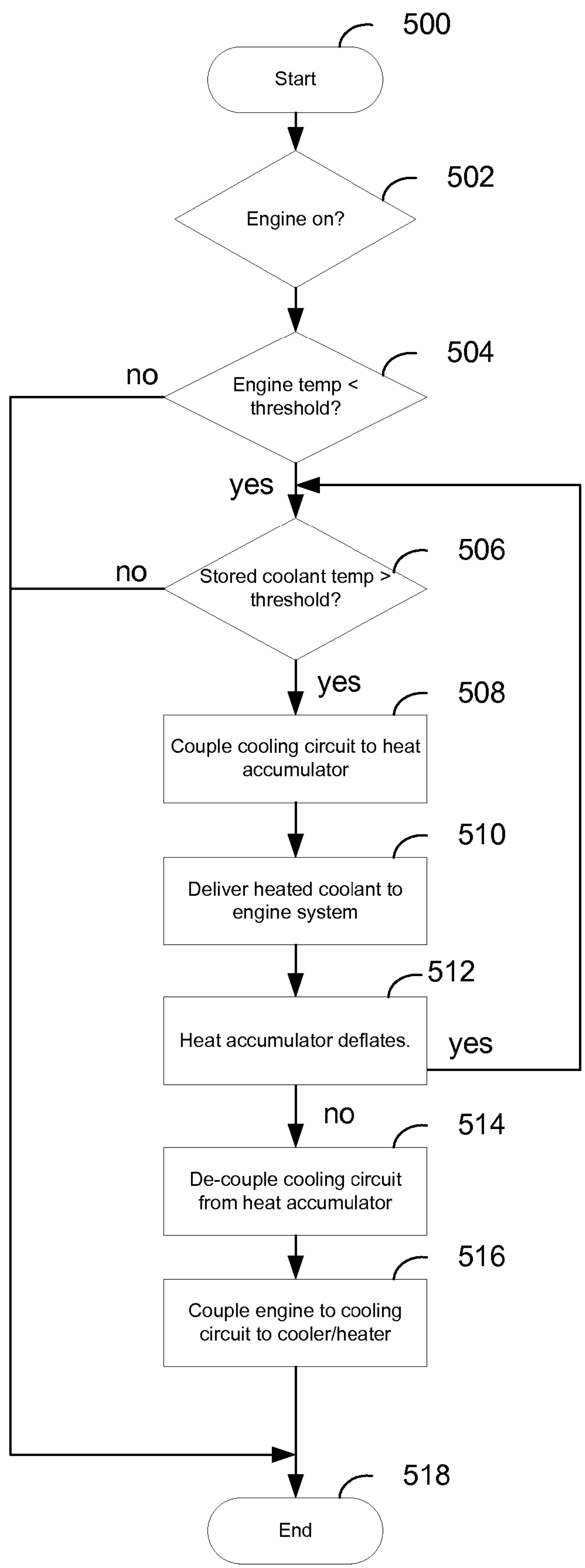
FIG. 5 shows an example routine for engine heating using a heat accumulator embodiment.

FIG. 1 shows an example embodiment of a heat accumulator from the front, a frontal cross section, and a side view. FIG. 2 shows an example cooling circuit that may be compatible with a heat accumulator embodiment. FIG. 3 illustrates an example under-hood view of a vehicle that may include a heat accumulator embodiment. FIG. 4 shows an example routine for filling or replenishing coolant within a heat accumulator. FIG. 5 shows an example routine for rapid engine heating using an embodiment of a heat accumulator.

FIG. 1 shows three illustrations of a heat accumulator 1 for a coolant of a vehicle engine or for a coolant or temperature control system for an engine. A cross section from a front view is illustrated on the left of the figure. A front view is shown in the center of FIG. 1 and a side view is shown on the left of FIG. 1.

The heat accumulator 1 may have a flexible storage container 2 and a carrier 3 for accommodating and mounting the storage container 2. The storage container 2 may have an inner body 4 and an outer body 5, wherein an insulation device 6 is arranged between the inner body 4 and outer body 5. The inner body 4 and the outer body 5 may be partially or completely composed of a fabric, wherein the fabric of the inner body 4, outer body 5, or both may be watertight by virtue of a rubber coating. The inner body 4 and the outer body 5 may be flexible. Storage container 2 may also be flexible. An insulator between body 4 and body 5 may help to extend the amount of time coolant can be stored at a temperature above atmospheric during engine off conditions.

The inner body or the inner sleeve 4 may enclose an interior space 7 for the coolant 8 that may be water for example. Seams of the bodies or sleeves 4, 5 can be bonded or vulcanized with or without being previously sewn. It is therefore possible for individual webs of fiber or components to be joined to form the desired container shape. The container shape may be tailored according to the available space in the engine compartment and may differ from the customary cylindrical or rectangular shapes in order to utilize the available space in an optimum way. The storage container 2 may have a volume for approximately 3 to 5 liters of liquid.

The fabric of the inner body 4 and/or of the outer body 5 may have a surface structure for increasing the stability and maintaining the water pressure. As the temperature rises, the coolant circuit may be under pressure which may be up to approximately 3 bar. The fabric and the connections or seams may be dimensioned in such a way that they are able to withstand this pressure. A predetermined brake point, such as scoring, may be provided starting from a certain pressure so that the container empties if impacted.

The insulation device 6 may be composed of a foam that may be chemically driven. The insulation device 6 may have a certain degree of rigidity or include a shape-providing material in order to maintain the shape of the storage container 2 even in the empty state. The insulation device may also be of flexible design so that the storage container 2 can be folded or collapsed.

An inflow 9 and an outflow 10 for the coolant 8 may be provided on an underside of the storage container 2. The inflow 9 may be adjoined in the interior space 7 by a pipe 11 from whose lower end the coolant 8 flows into the interior space 7 of the storage container 2. At the upper end of the pipe 11, the coolant 8 may leave the container 2 again. Valves or stopcocks may shut off the inflow 9 and/or the outflow 10.

A barrier 31 may be positioned within the interior of the container 2, and may have a flow limiter/valve 32. The inner body 4 and the outer body 5 may be attached to each other on the underside or in the region of the inflow 9 and of the outflow 10.

The carrier 3 may include or be entirely composed of thermoplastic material. The carrier 3 may have an attachment device on one side that may include a baseplate with screw holes, for attaching the heat accumulator 1 to the bodywork of the vehicle. The storage container may be encompassed entirely or in part by the storage container and may additionally or alternatively be fastened to the storage container by an additional mechanism.

The carrier 3 may have an open side, here the upper side, in order to facilitate the insertion of the storage container 2. Cutouts 13 may be provided on the sides and on the underside in order to save weight and costs. The carrier 3 may be dimensioned by the selection and configuration (thickness, structure) of the material in such a way that the storage container 2 is kept secure even in the case of a severe braking maneuver or impact.

FIG. 2 shows a coolant circuit 14 with a heat accumulator 1. For the purposes of flow direction it should be understood the coolant flow begins and ends at engine 15 for a single cycle. A temperature sensor 16 may be located within a portion of the cooling circuit upstream of a cooler 18 fluidically coupled via valve 17. Cooler 18 may then be fluidically coupled back to the engine via a water pump 19. A second circuit may run through a passenger compartment heater 20 and the water pump 19 upstream of the engine 15.

In normal operating (when the heat accumulator 1 is not receiving or delivering coolant to or from the engine), valve 17 may be located downstream of engine 15 and may couple cooler 18 to engine 1 and water pump 21 and heat accumulator 1 may be fluidically isolated from engine 15. Thus coolant leaving engine 15 may pass through cooler 18 and accelerated back through the engine by water pump 19. Similarly, during normal operation, valve 23 upstream of engine 15 may couple heater 20 to the engine and fluidically isolate heat accumulator 1 from engine 15. Heat from coolant may then be transferred to a heating unit for delivery to the passenger cabin. Coolant from heater 20 may then be recirculated back through engine 15 via water pump 19. A control system 52 may determine the amount of coolant to pass through the heater 20 and the cooler 18 in response to operating conditions or user input via temperature control unit.

The control system may actuate valves 17 and 23 in response to operating conditions or an engine-on event to couple heat accumulator 1 to the cooling circuit. It may also decouple from the cooling circuit heater 20 via valve 23 and cooler 18 via valve 17. In this mode, coolant may exit the engine through a conduit containing temperature sensor 16. Valve 17, having fluidically isolated cooler 18, may couple a water pump 21 to the engine. Water pump 21 may accelerate coolant into accumulator 1 during fill conditions or push coolant out of accumulator 1 during rapid engine heating. Coolant may then pass through temperature sensor 22 located downstream of heat accumulator 1. Valve 23, having fluidically isolated heater 20 from engine 15, may then couple the coolant from heat accumulator 1 to engine 15.

In other embodiments, during heat accumulator fill, valve 17 may fluidically isolate cooler 18 from engine 15 and couple heat accumulator 1 to engine 15. Valve 23, however, may remain closed and may fluidically isolate both heat accumulator 1 and heater 20 from engine 15. In this embodiment, heat accumulator 1 may be empty or partially empty prior to accumulator fill.

Further, during rapid engine heating, valve 17 may fluidically isolate heat both accumulator 1 and cooler 18 from engine 15. Valve 23 may then couple a full heat accumulator 1 to engine 15 and fluidically isolate heater 20 from engine 15. This method may allow heat accumulator 1 to empty after coolant is delivered to the engine for rapid heating. After heat accumulator 1 is empty, valve 23 and 17 may fluidically isolate heat accumulator 1 from engine 15 and respectively couple heater 20 and cooler 17 to engine 15.

Therefore, during normal operating conditions coolant may flow through valve 23 in a direction away from engine 15 and during fill conditions valve 23 may allow coolant to flow toward the engine 15 from heat accumulator 1. Valve 23 may be embodied as a two way valve or as a combination of independent valves. Thus, during normal operation, valve 23 may be considered to be downstream of engine 15 and upstream of heater 20. However, during rapid engine heating, valve 23 may be considered to be upstream of engine 15 and downstream of heat accumulator 1.

Cooler 18 may be a heat exchange device such as a radiator. Coolant may be accelerated through the engine 15 via water pump 19. Coolant may enter the engine and be contained within cavities that isolate coolant from fuel and air for combustion. These cavities may be referred to as the water jacket and run throughout the engine surrounding the engine chambers and may be fluidically coupled to the coolant inlet and outlet. Coolant may pass over engine cylinders and absorb an amount of heated created from combustion before exiting the engine. By absorbing heat from combustion and removing it from the engine, the engine may be maintained below a temperature threshold throughout operation.

In a first mode, a valve 17 actuated by the control system may fluidically couple the engine water jacket to a cooler 18, this may be responsive to engine temperature, duration of operation, or operating conditions. In this mode coolant may then enter a heat exchange device such as cooler 18 that may be embodied as a radiator. Heated coolant may pass through a series of conductive coils mutually separated by an air spacer. The conductive coils may absorb heat from the coolant which may then be absorbed by ambient air that may be accelerated over the coils by a fan and away from the engine.

In a second mode, the engine water jacket may be coupled to a heat accumulator such as that disclosed herein. In this mode the valve 17 may de-couple the engine 15 from the cooler so that no coolant passes through the cooler. In a third mode, the valve 17 may allow an amount of coolant to enter the cooler 18 and an amount of coolant to enter a heat accumulator. The amount of coolant delivered to the cooler and delivered to the heat accumulator may be controlled by a control system via actuators responsive to engine operating conditions or the temperature near or within the heat accumulator. This temperature may be or correspond to the temperature of coolant within the accumulator.

A further circuit may extend from the valve 17 via a water pump 21 to the heat accumulator 1. A temperature sensor 22 may be arranged downstream of the heat accumulator 1 which may then be coupled to another coolant circuit via valve 23. A venting system 24 may vent coolant circuit 14.

During normal operation, the heat accumulator 1 may be connected in parallel in the circuit. In other words, valves 17 and 23 may be switched in such a way that the coolant 8 flows through the cooler 18 and the heater 20, and not through the heat accumulator 1. In a heat storage operating mode, the valves 17 and 23 may be adjusted so that warm or hot coolant 8 flows into the heat accumulator 1 until the latter is filled with hot coolant 8. This may be detected by means of the temperature sensor 22. The two valves may then be switched back into the normal operating mode, such that the hot coolant 8 continues to be stored in the heat accumulator 1. The insulation device 6 of the heat accumulator 1 may help to maximize the duration of time that heat may be stored. Additionally or alternatively, a heat-storing material may be provided in the storage container 2 that may serve, in addition to the coolant 8 itself, as a heat accumulator that may then output heat to the coolant flowing past.

If the engine 15 is restarted after the end of travel and a relatively long stationary state or overnight resulting in a cold start, the temperature sensor 16 may measure a low temperature of the coolant 8. The valves 17 and 23 may be communicatively coupled to the temperature sensor 16 via a control system 52. The control system 52 may control actuators (not shown) that may actuate valves 17 and 23 in such a way that the warm coolant 8 from the heat accumulator 1 circulates through the engine 15 in a small circuit, to quickly heat up the engine 15. When the engine 15 has reached its operating temperature or a predefined temperature threshold, the valves 17 and 23 may switch over to the normal operating mode again.

The renewed filling of the heat accumulator 1 may occur before the switching over of the valves 17 and 23. Alternately, the valves 17 and 23 may be opened again at a later time in order to store warm coolant in the heat accumulator 1. During travel, recurring testing and/or refilling of the heat accumulator 1 may be provided in order to ensure a high temperature of the coolant 8 in the heat accumulator 1.

FIG. 3 shows on the right the engine compartment 25 of a vehicle in which an embodiment of heat accumulator 1 is arranged. On the left in FIG. 3, the heat accumulator 1 is illustrated removed from the engine compartment 25. The heat accumulator 1 here is in the shape of a non-equilateral right parallelepiped or a trapezoidal column. The shape may be optimized to the spatial conditions in the engine compartment 25.

In this embodiment the heat accumulator 1 is positioned in the engine compartment 25 under the engine compartment hood 29 and between side panels 30. A cooler 18, which may be embodied as a radiator, may be positioned near the front of the vehicle between headlights 27. During normal operating conditions, (heat accumulator not coupled to engine) the cooler 18 may receive hot coolant from engine 15 and transmit heat from coolant to ambient air. Hot coolant may also pass through a heater 20 near the passenger cabin to heat the cabin. Coolant may be accelerated by a pump 19 that may be coupled directly to the engine or located elsewhere in the cooling circuit.

When the heat accumulator is coupled to the engine, the heater and cooler may be decoupled from the engine to minimize heat loss in the transfer of coolant from engine 15 to heat accumulator 1 for storage. Further, this minimizes heat loss in the transfer of coolant from heat exchanger 1 to the engine 15 to allow for more rapid engine heating. Other embodiments may not decouple the engine from the cooler 18 or the heater, and may simply open valves so that the heat accumulator is coupled in series or in parallel to a component of the normal cooling circuit. In the latter configuration, valves may be actuated to allow an amount of coolant to enter or exit the heat accumulator as well as the component arranged in parallel with the heat accumulator 1.

The design of the heat accumulator 1 permits optimum adaptation to the respective spatial conditions through the selection of the shape of the heat accumulator 1. The heat accumulator 1 may be, for example, in the shape of a triangular column, in a shape with an L-shaped base face. The flexible storage container 2 permits a very large number of shapes, even irregular shapes, which may utilize the existing space efficiently. Particularly in combination with the holder 3, an advantageous combination of flexibility and stability is obtained.

Manufacturing of the irregular shapes of the storage container 2 and of the carrier 3 is easy to implement because of the design of the heat accumulator 1. For the storage container 2, corresponding pieces of fabric may be cut to size and connected to one another in order to form the inner body 4 and the outer body 5. The carrier 3 may be manufactured from a plastic, which may also take many different shapes.

A routine for operating an engine system equipped with a disclosed embodiment of a heat accumulator is shown in FIG. 4. A heat accumulator fill routine may be initiated at given intervals or in response to operating conditions by a control system at 400. At 402 it may be determined if the heat accumulator is currently storing an amount of engine coolant. If the storage container is empty is may be in an original shape maintained in part by the insulating or body material or the storage container. The original shape may also be fully deflated or collapsed.

If the storage container is empty, it may be coupled to the cooling circuit at 420. If the storage container was previously coupled to a heater or cooler it may first be decoupled from a heater or cooler prior to coupling with the heat accumulator. At 424 the heat accumulator may be filled with an amount of coolant that may have absorbed heat from engine combustion. The storage container may inflate or expand as it is filled with coolant at 426. If the storage container is filled to capacity with coolant it may have a fully filled shape. A storage container embodiment in a fully filled shape may have a greater outer volume and inner cavity volume than a storage container in an original shape. After container fill is complete, the heat accumulator may be decoupled from the cooling circuit. In some embodiments a heater or cooler may be re-coupled to the cooling circuit for normal engine operation.

At 405 a temperature sensor within the coolant circuit may determine the temperature of the coolant within the engine system. A temperature sensor in or near the heat accumulator may determine the temperature of the stored coolant within the heat accumulator. If the temperature of coolant within the accumulator is below a threshold at 405 the control system may initiate a method to replace the accumulated coolant. At 406 a valve may decouple the cooling circuit from a cooler and heater and another valve may couple the heat accumulator to the cooling circuit.

At 408 an amount of coolant may be ejected from the accumulator into the cooling circuit. An amount of hot coolant may be delivered to the heat accumulator at 410. Here 'hot' coolant refers to coolant that has absorbed an amount of heat from the engine.

At 412 the temperature may again be determined within the heat accumulator; if the temperature is below a threshold an amount of coolant may be again released from the accumulator at 408 and replaced by hot coolant at 410. This may continue until the temperature of the coolant is above a threshold that may correspond with the temperature of coolant within the cooling circuit. In other embodiments, the heat accumulator may be completely emptied of coolant and replaced with hot coolant from the cooling circuit. In other words, the amount of coolant released at 408 may be equal to the storage volume of the heat accumulator which may also be equal to the amount of coolant delivered to the heat accumulator from the cooling circuit at 410. The disclosed heat accumulator may deflate or collapse in part or entirely during and after coolant is released into the cooling circuit. The flexible storage container may also return to an empty configuration that may have a smaller total volume than it does in the filled configuration. An empty storage container may retain an open volume that may be supported in part by the material or insulating layer of the storage container. Upon filling the heat accumulator with heated coolant, the flexible storage container may expand or return to a filled configuration.

At 416 the cooling circuit may be decoupled from the heat accumulator and re-coupled to a cooler or heater and return to normal operation. The routine may end at 418. By this method, the coolant within the heat accumulator may remain at an optimum temperature during operation so that, when the engine cools down due to lower load or engine-off, heat may be retained from previous warmer engine operation.

A routine for rapid engine heating using an embodiment of the heat accumulator is shown in FIG. 5. This routine may be initiated after initial engine-on (initial ignition) after an engine-off period. If the engine is on at 502, it may be determined if the engine temperature is below a temperature that may correspond with a cold start at 504. If the engine temperature is below a threshold value it may be determined if the heat accumulator has stored coolant above a temperature threshold. This threshold may correspond to the temperature of the engine such that, if the stored coolant temperature is greater than the coolant temperature within the cooling circuit, the routine may continue to 506. If the temperature of coolant within the heat accumulator is not above a threshold the routine may end. Else the cooling circuit may be coupled to the heat accumulator at 508. This may include decoupling the cooling circuit from a cooler or heater. Heated coolant may then be delivered to the engine from the heat accumulator at 510. As coolant is ejected from the heat accumulator, the flexible storage container may shrink, collapse, or deflate to a smaller volume. After the coolant has been ejected into the cooling circuit, the heat accumulator may be de-coupled from the cooling circuit and coupled to a cooler or heater for normal operation.

By delivering heated coolant to the engine during cold start conditions the engine may absorb an amount of heat and warm more quickly, increasing fuel efficiency and decreasing performance losses from cold engine operation.

In another example, a cooling method includes during warmed-up engine condition, flowing coolant from the engine to a flexible storage container, bypassing a radiator, to fill the flexible storage container. Then, during a subsequent engine start (with an engine stopped condition there between), the method further includes flowing coolant from the flexible storage container to the engine and a heater core for a passenger compartment, simultaneously or sequentially. The flowing from the flexible storage container to the engine/heater core may be during cranking and/or run up, and/or after achieving a stable idle condition, of the subsequent engine start. Again, the flowing during starting may bypass the radiator and may include emptying the flexible storage container of warmed fluid, optionally replacing it with colder fluid. The flowing into and out of the flexible storage container may be controlled via an engine controller with computer readable storage medium having instructions therein for adjusting valves in the coolant system. In one example, the filling and/or emptying of the flexible storage container may be effected by an engine-driven coolant pump (that also operates to pump fluid during warmed engine conditions to cool the fluid in the radiator), and/or alternatively via a secondary, electrically driven pump.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A system, comprising:

a vehicle having an engine; and an engine cooling system including a heat accumulator for coolant, the heat accumulator comprising a flexible storage container with an inner body and an outer body, with an insulation device arranged between the bodies, and an inflow and an outflow for the coolant, the inner body comprised of rubber-coated fabric and in contact with the coolant when the heat accumulator is filled with the coolant.

2. The system of claim 1, wherein the flexible storage container is contained in some part by a carrier, and wherein the storage container is positioned under a hood in an engine compartment adjacent a body side panel of the vehicle.

3. The system of claim 2, wherein the carrier includes a thermoplastic material.

4. The system of claim 1, wherein a shape of the heat accumulator is not square and not cylindrical.

5. The system of claim 1, wherein the outer body comprises a rubber-coated fabric.

6. The system of claim 1, wherein the heat accumulator contains a heat storage medium.

7. The system of claim 6, wherein the heat storage medium is separated from an outer wall of the heat storage container by an insulator.

8. The system of claim 7, wherein the heat accumulator is selectively coupled to engine coolant passages and a radiator.

9. The system of claim 1, wherein the insulation device comprises a chemically-driven foam.

10. The system of claim 1, wherein the inflow and outflow are provided on an underside of the flexible storage container.

11. The system of claim 1, wherein the inner body defines an interior space configured to store the coolant.

12. The system of claim 1, wherein the heat accumulator is selectively coupled to a heater core for a passenger compartment of the vehicle.

13. The system of claim 3, wherein the carrier at least partially encloses the storage container at side regions and on an underside of the storage container.

14. A method for operating an engine system, comprising:

cooling an engine by pumping coolant through the engine via an engine water pump and fluidically coupling the engine to a heater via a heater valve and to a cooler via a cooler valve;

filling a heat accumulator and expanding a storage container of the heat accumulator by fluidically coupling the engine to the heat accumulator and fluidically decoupling the engine from the cooler by adjusting the cooler valve located downstream of the engine and upstream of the cooler and the heat accumulator;

emptying the heat accumulator and deflating the storage container by fluidically decoupling the engine from the heater and fluidically coupling the heat accumulator to the engine by adjusting the heater valve located downstream of the heat accumulator upstream of the engine; and accelerating coolant into or out of the heat accumulator via a heat-accumulator water pump located downstream of the cooler valve and upstream of the heater valve.

15. The method of claim 14, wherein expanding the storage container includes increasing a total volume of the storage container, and deflating the storage container includes decreasing the total volume of the storage container.

16. The method of claim 14, wherein expanding and deflating the storage container are responsive to one or more of a temperature of the storage container, a temperature of coolant within the storage container, an engine temperature, and temperature of coolant within a cooling circuit.

17. The method of claim 14, wherein filling the heat accumulator comprises filling the heat accumulator during warmed up engine conditions, and wherein emptying the heat accumulator comprises emptying the heat accumulator in response to a subsequent engine start.

* * * * *